United States Patent
Penev et al.

(10) Patent No.: US 6,888,960 B2
(45) Date of Patent: May 3, 2005

(54) FAST OPTIMAL LINEAR APPROXIMATION OF THE IMAGES OF VARIABLY ILLUMINATED SOLID OBJECTS FOR RECOGNITION

(75) Inventors: Penio S. Penev, New York, NY (US); Albert Peter Blicher, East Windsor, NJ (US); Rui Ishiyama, Kawasaki (JP)

(73) Assignee: NEC Corporation, Tokyo (JP)

( * ) Notice: Subject to any disclaimer, the term of this patent is extended or adjusted under 35 U.S.C. 154(b) by 699 days.

(21) Appl. No.: 09/919,206

(22) Filed: Jul. 31, 2001

(65) Prior Publication Data

US 2002/0186880 A1 Dec. 12, 2002

Related U.S. Application Data

(60) Provisional application No. 60/279,729, filed on Mar. 28, 2001.

(51) Int. Cl.$^7$ ............................................. G06K 9/00
(52) U.S. Cl. ..................... 382/154; 382/276; 345/427
(58) Field of Search ................... 382/154, 190, 382/118, 181, 197, 195, 225, 282, 294, 276, 224, 228, 274, 305; 359/9, 32, 22, 29; 345/418–419, 420, 426, 427; 709/222

(56) References Cited

U.S. PATENT DOCUMENTS

| | | | |
|---|---|---|---|
| 5,748,844 A | | 5/1998 | Marks .......................... 706/45 |
| 5,774,576 A | * | 6/1998 | Cox et al. .................... 382/160 |
| 6,121,969 A | * | 9/2000 | Jain et al. .................... 345/850 |
| 6,122,408 A | * | 9/2000 | Fang et al. .................. 382/274 |
| 6,169,817 B1 | * | 1/2001 | Parker et al. ................ 382/131 |
| 6,539,126 B1 | * | 3/2003 | Socolinsky et al. ......... 382/274 |

OTHER PUBLICATIONS

Basri, R. et al., "Lambertian Reflectance and Linear Subspaces," *Int'l Conf. Comp. Vis.*, Vancouver, BC, to appear in Jul. 2001.
Everson, R.M. et al., "Inferring the Eigenvalues of Covariance Matrices From Limited, Noisy Data," *IEEE Trans. Sig. Proc.*, No. 48, vol. 7, pps. 2083–2091, 2000.

(Continued)

*Primary Examiner*—Bhavesh M. Mehta
*Assistant Examiner*—Sheela Chawan
(74) *Attorney, Agent, or Firm*—Scully, Scott, Murphy & Presser (57) ABSTRACT

An efficient computation of low-dimensional linear subspaces that optimally contain the set of images that are generated by varying the illumination impinging on the surface of a three-dimensional object for many different relative positions of that object and the viewing camera. The matrix elements of the spatial covariance matrix for an object are calculated for an arbitrary pre-determined distribution of illumination conditions. The maximum complexity is reduced for the model by approximating any pair of normal-vector and albedo from the set of all such pairs of albedo and normals with the centers of the clusters that are the result of the vector quantization of this set. For an object, a viewpoint-independent covariance matrix whose complexity is large, but practical, is constructed and diagonalized off-line. A viewpoint-dependent covariance matrix is computed from the viewpoint-independent diagonalization results and is diagonalized online in real time.

11 Claims, 4 Drawing Sheets

OTHER PUBLICATIONS

Georghiades, A.S. et al., "From Few to Many: Generative Models for Recognition Under Variable Pose and Illumination," *Proc. 4th Int'l Conf. Automatic Face & Gesture Recognition*, pps. 264–270, Mar. 2000.

Hallinan, P., "A Low–Dimensional Representation of Human Faces for Arbitrary Lighting Conditions," *CVPR 94*, pps. 995–999, 1994.

Ishiyama, R. et al., "A New Face–Recognition System with Robustness Against Illumination Changes," *IARP Workshop Mach. Vis. Appl.*, pps. 127–131, Nov. 2000.

Linde, Y. et al., "An Algorithm for Vector Quantizer Design," *IEEE Trans. Commun.*, No. 28, pps. 84–95, 1980.

Loeve, M. "Probability Theory," pps. 455–493.

Penev, P.S., "Local Feature Analysis: A Statistical Theory for Information Representation and Transmission," Ph.D. Thesis, The Rockefeller University, NY, NY, 1998.

Penev, P.S. et al., "The Global Dimensionality of Face Space," *Proc. 4th Int'l Conf. Automatic Face & Gesture Recognition*, pps. 264–270, 2000.

Rose, K., "Deterministic Annealing for Clustering, Compression, Classification, Regression, and Related Optimization Problems," *Proc. IEEE*, vol. 86, No. 11, pps. 2210–2239, 1998.

Sengupta, A.M. et al., "Distributions of Singular Values for Some Random Matrices," *Phys. Rev. E*, vol. 60, No. 3, pps. 3389–3392, 1999.

Silverstein, J.W., "Eigenvalues and Eigenvectors of Large–Dimensional Sample Covariance Matrices," *Contemporary Mathematics*, pps. 153–159, 1986.

Tipping, M.E. et al., "Mixtures of Probabilistic Principal Component Analysers," *Neural Comput.*, vol. 11, No. 2, pps 443–482, 1999.

\* cited by examiner

FAST OPTIMAL LINEAR APPROXIMATION OF THE IMAGES OF VARIABLY ILLUMINATED SOLID OBJECTS FOR RECOGNITION

CROSS REFERENCE TO RELATED APPLICATION

This application claims priority from U.S. Provisional Application No. 60/279,729 filed Mar. 28, 2001.

BACKGROUND OF THE INVENTION

1. Field of the Invention

This invention relates to computer vision and more specifically to the efficient computation of the low-dimensional linear subspaces that optimally contain the set of images that are generated by varying the illumination impinging on the surface of a three-dimensional object, such as a human head, for many different relative positions of that object and the viewing camera.

2. Prior Art

Figure 1A:
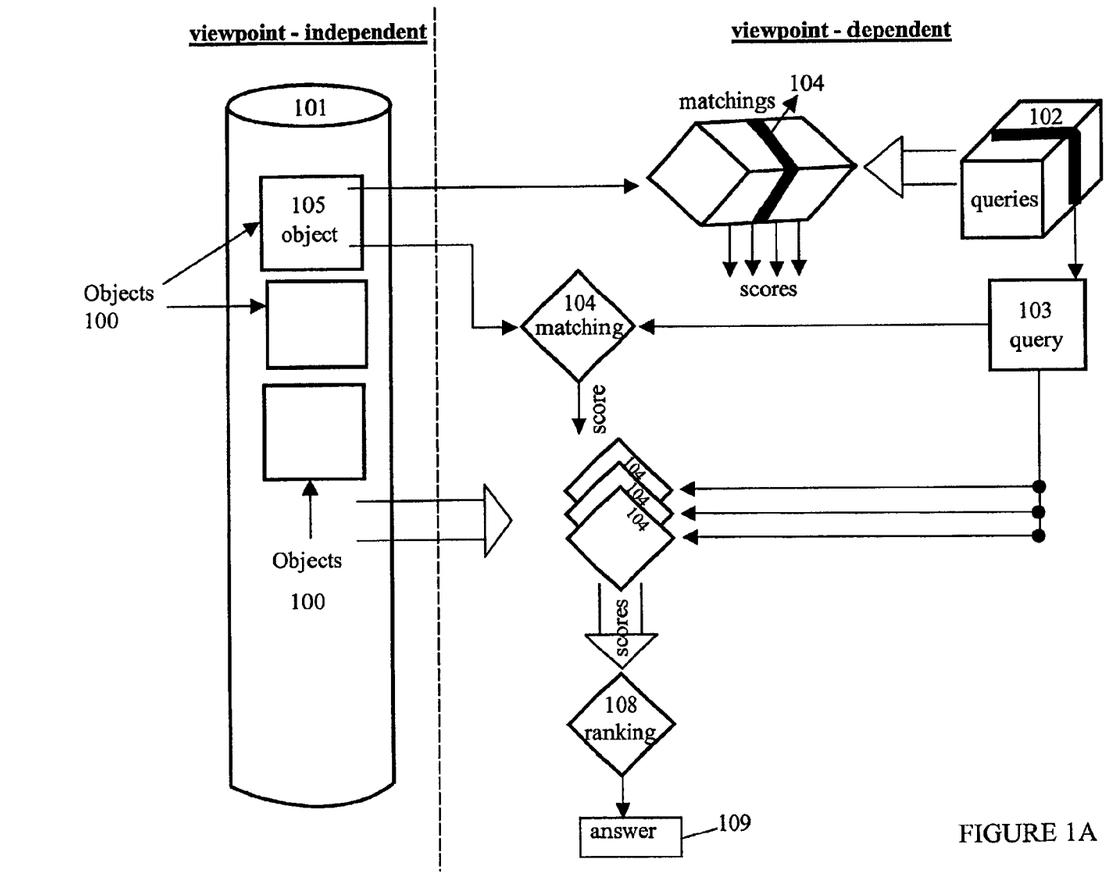
FIGS. 1A and 1B are general flowcharts of the prior-art matching process.
Figure 1B:
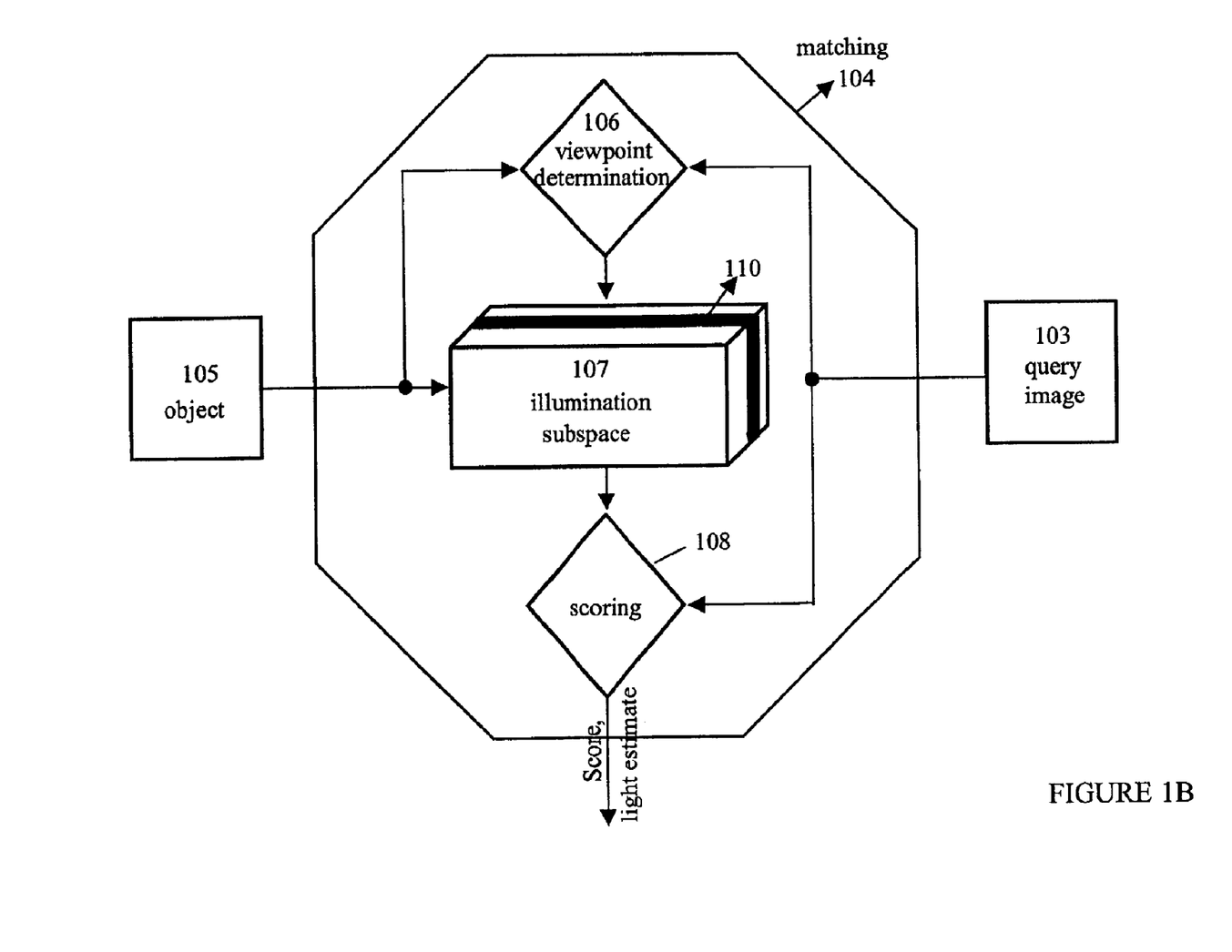

In a typical system for object recognition under varying viewpoint and illumination conditions, information about properties, such as the three-dimensional shape and the reflectance, of a plurality of objects 100, such as human faces and/or heads, is stored in a database 101. When such a system is in use, typically a plurality of queries 102, in the form of images of objects taken from non-fixed viewpoint and illumination conditions, is matched against said database 101. For each query image 103, matching 104 is performed against all objects 100 in said database 101.

In order to match an individual object 105 against an individual query 103, several steps are typical. First, the viewpoint of the query is estimated 106. Second, a viewpoint-dependent illumination subspace 107 is generated, as outlined below, from: the three-dimensional data about each said object 100, and the determined viewpoint 106. Further, either the illumination condition is estimated, or a similarity score is generated, or both 108.

The scores from the matching of said query 103 to said plurality of objects 100 are finally compared against each other to determine the best match 109 resulting in object 105 being recognized.

The set of images of a given object under all possible illuminations, but fixed viewpoint, will be called the illumination subspace of the object for that viewpoint. It has been both observed in practice, and argued in theory, that said illumination subspace is mostly enclosed in a low-dimensional subspace, with dimensionality M as low as M$\epsilon$. See P. Hallinan, "A Low-Dimensional Representation of Human Faces for Arbitrary Lighting Conditions", *IEEE Conference on Computer Vision and Pattern Recognition*, pp. 995–999 (1994); and R. Basri et al., "Lambertian Reflectance and Linear Subspaces", to appear in the *International Conference on Computer Vision*, (July 2001).

There are several object, and more specifically face, recognition algorithms that are based implicitly or explicitly on this fact. See Georghiades et al., "From Few to Many: Generative Models for Recognition Under Variable Pose and Illumination", *Proceedings of the 4th International Conference on Automatic Face & Gesture Recognition*, pp. 264–270, (March 2000); R. Ishiyama et al., "A New Face-Recognition System with Robustness Against Illumination Changes", *IAPR Workshop on Machine Vision Applications*, pp. 127–131 (November 2000); and Basri, et al. supra.

Estimation of a Gaussian Probability Density by the Karhunen-Loève Transform

The method for finding a hierarchy of low-dimensional subspaces that optimally contain a given set of images, or more generally, snapshots, is the Karhunen-Loève Transform (KLT), which is known under a variety of names—Principal Component Analysis, Empirical Eigenfunctions, and Singular Value Decomposition (SVD)—and is closely related to Linear Regression and Linear Factor Analysis, among others. See M. Tipping et al., "Mixtures of Probabilistic Principal Component Analysers", *Neural Computation*, Vol. 11, No. 2, pp. 443–482 (February 1999).

The basic facts about the KLT are summarized in this section. Of importance for the disclosure further are the implementation choices, the optimality properties, and the requirements for computational time and storage space. Also, frequent references to the equations herein will be made below.

A snapshot, such as an image, will be represented by the intensity values $\phi(x)$, where $\{x\}$ is a pixel grid that contains V pixels. An ensemble of T snapshots will be denoted by $\{\phi^t(x)\}_{t \in T}$. Briefly, (see I. Joliffe, "Principal Component Analysis" (1986); and P. Penev, "Local Feature Analysis: A Statistical Theory for Information Representation and Transmission", PhD Thesis, The Rockefeller University, (1998)) its KLT representation is $$\phi^t(x) = \sum_{r=1}^{M} a_r^t \sigma_r \psi_r(x) \quad (1)$$

where M=min(T,V) is the rank of the ensemble, $\{\sigma_r^2\}$ is the (non-increasing) eigenspectrum of the "spatial"

$$R(x, y) \triangleq \frac{1}{T} \sum_t \phi^t(x) \phi^t(y) = \sum_{r=1}^{M} \psi_r(x) \sigma_r^2 \psi_r(y) \quad (2)$$

and the "temporal"

$$C^{tt'} \triangleq \frac{1}{V} \sum_x \phi^t(x) \phi^{t'}(x) = \sum_{r=1}^{M} a_r^t \sigma_r^2 a_r^{t'} \quad (3)$$

covariance matrices, and $\{\psi_r(x)\}$ and $\{a_r^t\}$ are their respective orthonormal eigenvectors. When M=T<V, the diagonalization of C (eqn. 3) is the easier.

Notably, the storage of C requires $O(T^2)$ storage elements, and of R, $O(V^2)$—the dependence of the storage requirements on the size of the problem is quadratic. Analogously, the time to compute the eigenvalues and eigenvectors (eqn. 2) of C is $O(T^3)$, and of R, $O(V^3)$—the dependence of the computational time on the size of the problem is cubic. In practical terms, this means that solving a system that is ten times as large requires a hundred times the space and a thousand times the computational power.

The average signal power of the ensemble is $$\frac{1}{TV} \sum_{x,t} |\phi^t(x)|^2 = trR \equiv trR_M \triangleq \sum_{r=1}^{M} \sigma_r^2 \quad (4)$$

KLT is optimal in the sense that, among all N-dimensional subspaces (N<M), the subset of eigenmodes $\{\Psi_r\}_{r=1}^{N}$ (eqn. 2) span the subspace which captures the most signal power, $trR_N$. See M. Loeve, "Probability Theory", (1955); and I. Joliffe, supra. For a given dimensionality N, the reconstruction of the snapshot $\phi(x)$ is $$\phi_N^t(x) \triangleq \sum_{r=1}^{N} a_r^t \sigma_r \psi_r(x) \qquad (5)$$

With the standard multidimensional Gaussian model for the probability density P[ϕ] the information content of the reconstruction (eqn. 5) is $$-\log P[\phi_N^t] \propto \sum_{r=1}^{N} |a_r^t|^2 \qquad (6)$$

Notably, this model is spherical—the KLT coefficients (eqn. 1) are of unit variance (eqn. 3), $\langle a_r^t{}^2 \rangle = 1$, and each of the N dimensions contributes equally to the information that is derived from the measurement, although only the leading dimensions contribute significantly to the signal power.

This is a manifestation of the fact that, in principle, even weak signals can be important if they are sufficiently rare and unexpected. In practice, however, signals are embedded in noise, which typically has constant power; and weak signals, even though important, may not be reliably detected.

The situation is complicated further by the fact that in practice every estimation is done from a finite sample (T<∞,V<∞). Nevertheless, the shape of the eigenspectrum of sample-noise covariance matrices is known—it is determined by the ratio V/T (See J. Silverstein, "Eigenvalues and Eigenvectors of Large-Dimensional Sample Covariance Matrices", *Contemporary Mathematics*, Vol. 50, pp. 153–159 (1986); and A. Sengupta et al., "Distributions of Singular Values for Some Random Matrices", *Physical Review E*, Vol. 60, No. 3, pp. 3389–3392, (September 1999), and this knowledge can be used to recover the true spectrum of the signal through Bayesian estimation. See R. Everson et al., "Inferring the Eigenvalues of Covariance Matrices from Limited, Noisy Data", *IEEE Transactions on Signal Processing*, Vol 48, No. 7, pp. 2083–2091, (2000). Although this can serve as a basis for principled choice for the dimensionality, N, also called model selection, in the context of face recognition, this choice is typically guided by heuristic arguments. See P. Penev et al., "The Global Dimensionality of Face Space", *Proceedings of the 4th International Conference on Automatic Face & Gesture Recognition*, pp. 264–270 (March 2000).

Viewpoint-Dependent Subspaces for Face Recognition

At the heart of most high-level algorithms for computer vision is the question: How does an object look from a specific viewpoint and a specific illumination condition?

Here we describe the standard method for finding the illumination subspace 107—a small number of basis images 110 {ψ_r(x)}(eqn. 2) which can be linearly admixed (eqn. 5) to approximate substantially all images of a given object under a fixed viewpoint, but any illumination condition.

An illumination condition at a given point, x, on the surface of an object is defined by specifying the intensity of the light, L(x,n) that is coming to the point from the direction n∈S², where n is a normal vector on the unit sphere S² centered at that point. Typically, the assumption is made that the light sources are sufficiently far away from the object—the distance to them is much larger than the size of the object—and therefore all points on the surface see the same illumination, L(n).

In order to calculate the illumination subspace, it is customary to first generate a finite set of T illumination conditions $\{L^t(n)\}_{t \in T}$, and from them, a corresponding set of images $\{I^t(x)\}_{t \in T}$ of the object the under a fixed viewpoint. When $I^t(x)$ is identified with $\phi^t$ from (eqn. 2), the Illumination subspace hierarchy is determined by (eqn. 3), and an application-dependent cutoff, N (cf. eqn. 5), is chosen.

There are two general ways to generate an image $I^t(x)$ for a given illumination condition: to make an actual photograph of the physical object under the given illumination condition, or to use computer graphics techniques to render a 3D model of the object. See A. Georghiades, supra.; and R. Ishiyama et al., supra.

Although the first method is more accurate for any given picture, it is very labor-intensive, and the number of pictures that can be done is necessarily small. Thus, the practical way to attempt the sampling of the space of illumination conditions is to use synthetic images obtained by computer rendering of a 3D model of the object.

When doing computer rendering, very popular is the assumption that the reflectance of the surface obeys the Lambertian reflectance model (See J. Lambert, "Photometria Sive de Mensura et Gradibus Luminus, Colorum et Umbrae," (1760)): the intensity of the reflected light I(x) at the image point x from a point light source, L which illuminates x without obstruction is assumed to be $$I(x) = \alpha(x) L \cdot p(x) \qquad (7)$$

where α(x) is the intrinsic reflectance, or albedo, p(x) is the surface normal at the grid point x, and '•' denotes the dot product of the two vectors.

Since the Lambertian model (eqn. 7) is linear, the sampling of the space of illumination conditions can be chosen to be simple—the $I^t$ is rendered with a single point-light source illuminating the object from a pre-specified direction—$n^t$:

$$L^t(n) = l^t \delta(n - n^t) \qquad (8)$$

where $l^t$ is the intensity of the light that comes from this direction. Moreover, the typical assumption is that light from any direction is equally probable, and $l^t$ is taken to be a constant, typically unity.

Sufficient sampling of the illumination space is expensive. Currently, the space of images of a given object under varying illumination conditions but a fixed pose (camera geometry) is sampled by sampling the illumination conditions. These samples are used to estimate the full space. The current approach suffers from the following problems:

sampling is expensive: either by varying the light physically and taking pictures, or by rendering a 3-dimensional model;

therefore, A) dense sampling is not performed, leading to an inaccurate model, or B) dense sampling is performed, which makes the system unacceptably slow.

Therefore, currently the subspace approach cannot be practically applied to certain face recognition tasks.

Dense sampling of the illumination space consumes impractically large time and memory. In order to make the model of the subspace more accurate, denser and denser sampling of the illumination conditions is necessary. This entails quadratic growth of the necessary storage space and cubic growth in the time of finding the enclosing linear subspace. As the accuracy of the model increases, the complexity becomes limited by the number of pixels in the image; this complexity is impractically large.

Direct computation of the covariance matrix is expensive. In the regime where the complexity of the model is limited by the number of pixels in the images, an amount of computation quadratic in the number of pixels is necessary to calculate the elements of the covariance matrix. This is only practical if the individual computation is fast.

The computations for a given 3D object need to be done for arbitrary viewpoint. In typical situations, many 3D objects need to be matched to a given query, for multiple queries. The viewpoints for which the respective enclosing linear subspaces need to be calculated are not known in advance, and change with every query/model pair. When the time for finding an illumination subspace for a given viewpoint is large, practical application of the method is impossible.

SUMMARY OF THE INVENTION

The disclosed method involves a series of steps.

Figure 2:
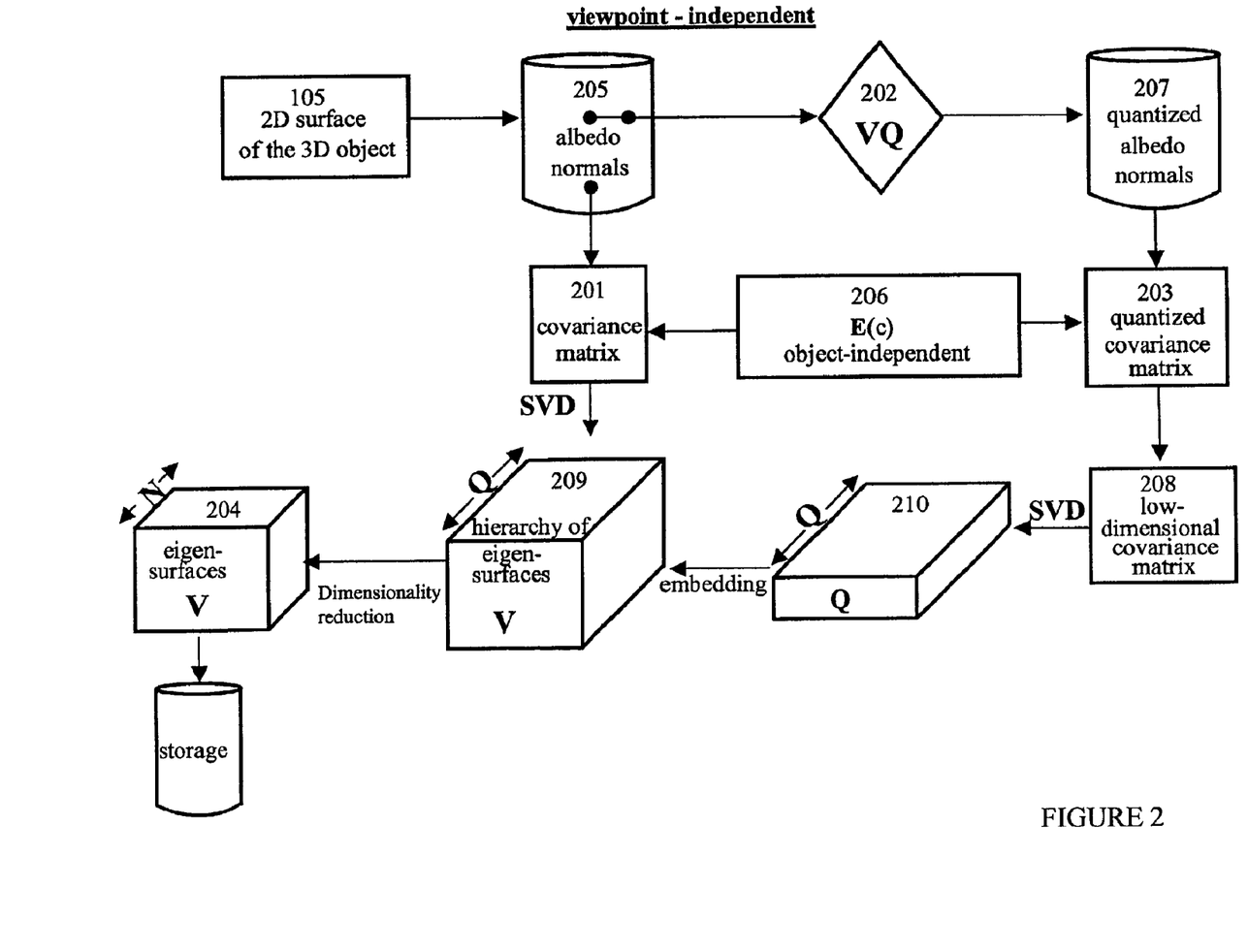
FIG. 2 is a flowchart of the viewpoint-independent steps or the present invention.

First, for any given object 105 in said database 101, the matrix elements of the spatial covariance matrix 201 are calculated for an arbitrary pre-determined distribution of illumination conditions. We disclose a method for such a calculation in which the matrix element for any given pair of pixels, for the most common assumption of illumination conditions, only depends on a scalar parameter—the planar angle between the surface normals at these pixels. Moreover, we disclose a method for the efficient approximation and tabulation of this dependency 206.

Second, for any given 3D object 105, we reduce the maximum complexity of the model by first constructing the set 205 of all pairs of an albedo and a normal vector—one pair from each point on the surface of the object—and then approximating every such pair with the corresponding centers of the clusters that are the result of vector quantization 202 of this set.

Third, for any 3D object 105, we construct and diagonalize off-line a viewpoint-independent covariance matrix 201 whose complexity is large, but practical 203. Further, we store only the leading subspace of that matrix 204.

Figure 3:
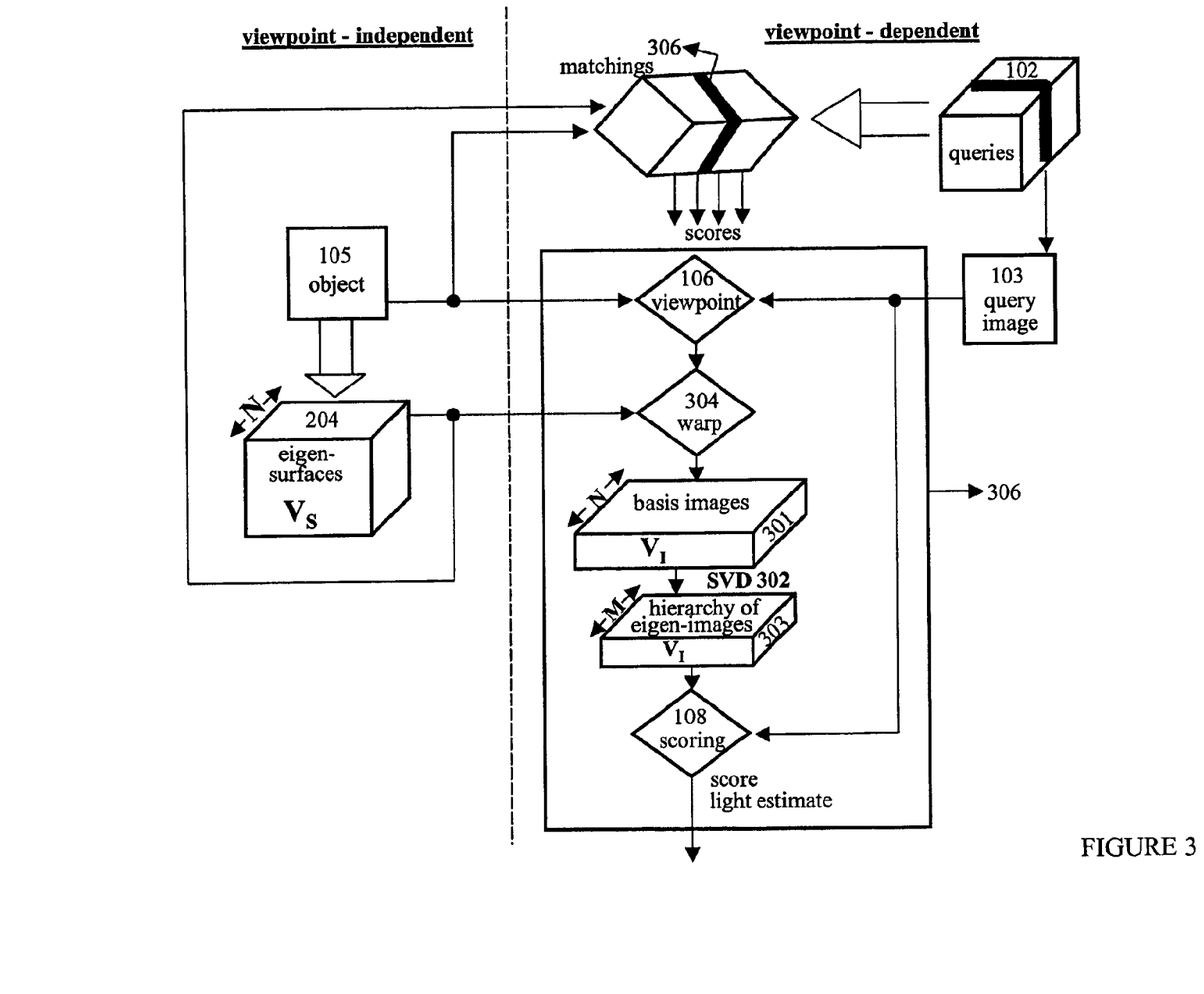
FIG. 3 is a flowchart of the viewpoint-dependent steps of the present invention.

Fourth, for any given viewpoint of a 3D object 105, the complexity of said viewpoint-dependent illumination subspace 107 is bounded from above by some small number, which is much larger than the actual complexity, but much smaller than the number of clusters from the previous step. A viewpoint-dependent covariance matrix 301 is computed from the viewpoint-independent diagonalization results 204 and is diagonalized online in real time 302. The leading subspace 303 of this covariance matrix is an approximation of the true solution 107.

The present invention provides the following advantages that solves those problems with prior art methods.

The model is accurate because the illumination conditions are, in effect, sampled infinitely densely.

The complexity is reduced in an optimal way by vector-quantizing the set of actual normal vectors.

The calculation of the individual matrix element is fast, because it involves only the calculation of a cosine and a lookup of a table.

Sufficient precision is maintained throughout all viewpoint-independent calculations, which need to be done only once per 3D object, and therefore can be done off line. The real-time, viewpoint-dependent computations are performed in a low-dimensional space, which makes them practically feasible.

The invention allows the efficient computation of the low-dimensional linear subspaces that mostly contain the set of images that are generated by varying the illumination impinging on the surface of a 3-dimensional object, such as a human head, for many different viewpoints—relative positions of that object and the viewing camera.

This is necessary in order to use in practice any object-recognition method that utilizes a low-dimensional viewpoint-dependent linear subspace.

Apart from the primary use of the disclosed method as a necessary step in face recognition, it makes practically feasible the use of a low-dimensional viewpoint-dependent linear subspace for: the estimation of the lighting conditions of an image; the estimation of the pose of the 3D object in that image; the recognition of an object within a class of objects.

DETAILED DESCRIPTION OF THE INVENTION

Fast Calculation of an Element of the Spatial Covariance Matrix for a Given Continuous Distribution of Illumination Conditions The results of any high-level computer-vision algorithm, such as determination of the light sources and recognition of a 3-dimensional object, critically depend on the degree of correctness of the low-dimensional subspace 107 in which the images of the target object 105 are believed to be contained.

In order to build increasingly correct approximations of said sub space 107, increasingly finer samplings of the illumination conditions are necessary. This is, however, a problem, since for every sample point a new rendering of the object needs to be made, and the rendering operation is very expensive. Also, since the direction of the illumination is parameterized by the points on a sphere—a two-dimensional surface—the number of samples on that surface, T, grows quadratically, $T=O((1/d)^2)$, with the sampling quality—the inverse of the distance between the samples, d—and hence the storage space is $O((1/d)^4)$, and the computational requirements, $O((1/d)^6)$. That is, to increase the accuracy of the sampling ten times, the storage requirement is increased ten thousand times, and the required computational power, one million times.

In order to solve the problem with the density of sampling of the illumination conditions, we disclose the following method for calculating the elements of the spatial covariance matrix 201 (eqn. 2) under infinitely dense sampling of space of illumination conditions (cf. eqn. 8).

According to (eqn. 2) the same subspace can be found by either diagonalizing the "temporal" covariance matrix, C, or the "spatial" one, R. We disclose below a method to calculate, according to (eqn. 2), the element R(x,y) for infinitely dense sampling of the illumination conditions.

When the image I is identified with $\phi$, and the point-source basis is used (eqn. 8), the individual element of the sum in (eqn. 2) that corresponds to a light source L, with intensity $L \equiv \|L\|$ and coming from direction $n \equiv L/L$, is $$I^L(x)I^L(y)=\alpha(x)\alpha(y)L \cdot p(y)=\alpha(x)\alpha(y)D(L,p,q) \qquad (9)$$

Where D(L,p,q) depends on the light, and only on the value of the normals p and q, but not on which particular points of the image they appear at. Therefore, the matrix element R(x,y) is viewpoint-independent.

In order to calculate D(L,p,q), we express the vectors in a coordinate system in which the z-axis is perpendicular to the plane defined by p and q, and the x-axis is along the bisector of the angle between them, 2θ. In these coordinates $$p=(c,+s,0)$$

$$q=(c,-s,0) \qquad (10)$$

$$L=(L_x,L_y,L_z)$$

where $c=\cos\theta$, and $s=\sin\theta$; then $L \cdot p = cL_x + sL_y$, $L \cdot q = cL_x - sL_y$, and finally $$D(L,p,q)=c^2L_x^2-(1-c^2)L_y^2=L^2(c^2n_x^2-(1-c^2)n_y^2) \equiv L^2C(n,c) \qquad (11)$$

where L is the light intensity and n is the unit vector in the light direction. Notably, the result does not depend on the vectors p and q individually, but only on the cosine of the half-angle between them, c; this forms the foundation of the method for fast calculation of the matrix element R(x,y). Also note this result (eqn. 11) does not depend on the z-component of the light.

We now calculate the matrix element R(x,y) from (eqn. 2). In the limit of infinitely dense sampling, the sum $$\frac{1}{T}\sum_t$$

is replaced by an integral over all possible light directions, weighted by their respective intensities $$R(x, y) = \alpha(x)\alpha(y) \int_{n \in S^2} L^2(n) D(n, p, q) \qquad (12)$$

$$= \alpha(x)\alpha(y) E(u_x, u_y, c)$$

where $u_x$ and $u_y$ are the unit vectors of the special coordinate system defined by p and q (eqn. 10). Depending on the symmetry of the assumptions for the illumination conditions, $E(u_x, u_y, c)$ depends on either three, two, or one parameter. Notably, it does not depend on the 3D object itself, and can be pre-calculated once for the whole database of objects.

The most common case, which is also the most symmetric, allows a further simplification. With the assumption that there is no preferred direction in the illumination—light could come from any direction equally likely (cf. eqn. 8)—L(n) is a constant, and the integral (eqn. 12) no longer depends on the special coordinate system (eqn. 10); it depends only on c. In that case, it can be calculated in advance with great precision and stored in a one-dimensional table; this makes its use later essentially free. The final formula for the matrix element is then $$R(x,y) = \alpha(x)\alpha(y) E(c(p(x), q(y))) \qquad (13)$$

where the only operations involved in the calculation are table lookups, one cosine function, and two multiplications.

Notably, (eqn. 12) is much more generally applicable than the point-light-source illumination conditions that were assumed in its derivation. Suppose there is an a priori distribution of illumination conditions—the probability density that l is the light intensity that comes from a particular direction $n \in S^2$ on the unit sphere, $S^2$, is P[l(n)]; this density integrates to a distribution, σ, which induces the measure dσ. Then, in the limit of infinitely dense sampling, the sum $$\frac{1}{T}\sum_t$$

is replaced by and integral over all possible illumination conditions, weighted by their respective probabilities $$R(x, y) = \alpha(x)\alpha(y) \int_{l \in (R^+)^{S^2}} d\sigma \int_{n \in S^2} l(n) D(n, p, q) \qquad (14)$$

$$= \alpha(x)\alpha(y) \int_{n \in S^2} D(n, p, q) \int_{L \in (R^+)^{S^2}} d\sigma l(n)$$

$$= \alpha(x)\alpha(y) \int_{n \in S^2} D(n, p, q) L(n)$$

which is identical to (eqn. 12); L(n) is interpreted now as the average light intensity that comes from direction n.

In summary, for any assumed or estimated distribution of illumination conditions, not necessarily from point light sources, the matrix element R(x,y) (eqn. 2) does not depend on the object in question, and therefore can be pre-calculated once for database 101 and stored 206 for successive use (eqn. 12). Also, in the most complicated case, a 3-dimensional table is necessary, which is practical. Moreover, in the most common case, only a one-dimensional table is needed (eqn. 13), which requires essentially zero computational and storage resources in practice.

Monte-Carlo Calculation of the Integrals Involved

In order for (eqn. 12) to be useful in practice, there has to be a practical way to evaluate the integral. In the simplest case, when the illumination conditions are isotropic (eqn. 13), the integral is relatively simple $$E(c) = \int_{n \in S^2 \cap \{C(n,c) > 0\}} c^2 n_x^2 - (1-c^2) n_y^2 \qquad (15)$$

and can be evaluated analytically. Here, the condition C(n, c)>0 (eqn. 11) ensures that both points are simultaneously visible from the given direction, (n). In general, since the assumed light-source distribution L(n) can be anything, even something that has been experimentally measured and does not have an analytic form to begin with, it is of interest to be able to calculate (eqn. 12) numerically. Because the result is object-independent, this can be done just once for the whole database 101, and stored 206.

A feasible approach for the evaluation of (eqn. 15) is the Monte Carlo (MC) procedure for evaluating integrals. In this case, the same procedure is iterated over many random realizations $\xi \in X$. First a random vector is generated, $r_\xi \in [0, 1]^3$, that is uniformly distributed in the unit cube. The subset that is also in the unit sphere, $\{r_\xi | \|r_\xi\| < 1\}$, is hence uniformly distributed there. Then, the normalized random vectors $\{n_\xi = r_\xi / \|r_\xi\| | \|r_\xi\| < 1\}$ are distributed uniformly on the surface of the unit sphere, $S^2$. This procedure for generating uniformly distributed normals is relatively efficient—a large fraction, $4\pi/(3*8) \approx 52\%$ of the vectors $r_\xi$ can be used to produce useful normal vectors, $n_\xi$.

The next step is to discard those light directions for which one or both of the surface points are not visible. This is achieved by the test for the condition C(n,c)>0. For the rest of the directions, from which both surface points are visible, the integrand is evaluated and accumulated.

Another computational saving can be achieved, which is grounded in the fact that the joint-visibility condition, C(n, c), is a monotonically increasing function of c. This allows one to find, for any random light direction, $n_\xi$, the value $c_\xi | C(n_\xi, c_\xi) = 0$, which defines the border of the joint-visibility, and then update all intermediate results for the integrals $\{E(c)|c>c_\xi\}$. Thus, the integrals (eqn. 15) are calculated simultaneously, in the same MC procedure.

Finally the results are tabulated and stored 206 for the subsequent calculation of R(x,y) for said plurality of objects 101.

Optimal Dimensionality Reduction By Vector Quantization

An efficient method is disclosed above to calculate the element R(x,y) of the spatial covariance matrix 201 (eqn. 2) when the space of illumination conditions is sampled infinitely densely. In order for that method to be useful in practice, the covariance matrix R needs to be diagonalized in reasonable time. In a typical picture, there are V=480× 640≈300,000 pixels. Even if the object occupies only a fraction of the picture, say 10%, this still leaves too large a matrix to be subsequently diagonalized. Here we disclose a method to reduce the dimensionality of the problem and at the same time optimally retain the illumination subspace.

This method is based on the fact that when the elements of a matrix are perturbed slightly, then the perturbations in the eigenvectors and eigenvalues are also small, and are bounded if the perturbation in the matrix elements is bounded. See R. Everson et al., supra. Below we disclose a method for finding a family of optimally small perturbations that decrease the dimensionality of the system, and thus, the time to diagonalize it.

Indeed, when the normal vector to the surface p(x) at the point x is close to some reference normal $\hat{q}$, and also its albedo $\alpha(x)$ is close to a reference albedo $\hat{\alpha}_q$, then the substitution of $\alpha(x)$ and p(x) with $\hat{\alpha}_q$ and $\hat{q}$, respectively, in (eqn. 13) would lead to a small perturbation of R(x,y). Then, if many image points have albedos and normals that are close to the same reference albedo and normal-vector pair, substituting all of them will lead to a series of small perturbations in the matrix elements of R, but will also reduce the degrees of freedom in the problem.

Thus, a solution to the large-dimensionality problem is to find a set of Q pairs of reference values 207 for the albedo and normals, $\{(\hat{\alpha}_q,\hat{q})\}_{q\in Q}$ such that, for a given value of Q, the perturbations are smallest. This is exactly the setting of a variety of vector quantization algorithms—given a set of vectors, $\{(\alpha(x),p(x))\}_{x\in V}$ in our case 205, these algorithms cluster them together in Q clusters, and find their centroids 207, $\{(\hat{\alpha}_q,\hat{q})\}_{q\in Q}$, such that the average distance from the vectors to the nearest respective cluster-centroid, $q(x)\equiv q_x$, is minimal.

There are many algorithms for VQ, and most are suitable as a step in the solution of our problem. We highlight two of them here as preferred practice: the Linde-Buzo-Gray algorithm, which benefits from a straightforward and conceptually clean implementation and has been found to perform well in practice, and the Deterministic Annealing (DA) algorithm which has better speed, convergence, and optimality properties, albeit with a more complicated implementation. See Y. Linde et al., "An Algorithm for Vector Quantizer Design", *IEEE Transactions on Communications*, Vol. 28, pp. 84–95 (1980); and K. Rose, "Deterministic Annealing for Clustering, Compression, Classification, Regression, and Related Optimization Problems", *Proceedings of IEEE*, Vol. 86, No. 11, pp. 2210–2239 (1998).

In summary, for any object 105 in said database 101, the set is generated of all of pairs of normals and albedo 205. Then, for any desired complexity, Q, this set is clustered into Q clusters 207, and the original matrix elements R(x, y) are perturbed, according to (eqn. 13), to $$R(x,y) \to R_Q(x,y)(=R_Q(q_x,q'_y)=\hat{\alpha}_{q_x}\hat{\alpha}_{q_y}E(c(\hat{q}_x,\hat{q}'_y))) \quad (16)$$

Notably, the rank of the V×V matrix $R_Q(q_x,q'_y)$ is the same as that of the Q×Q matrix 208 with elements $\sqrt{N_q N'_q} R_Q(q,q')$, where $N_q$ is the number of image points that are clustered together in the cluster q; this rank is at most Q, which makes the diagonalization practical, for moderately large values of Q. Moreover, the eigenvalues of these two matrices are the same, and their eigenvectors are simply related—once the smaller set is known 209, the larger set 210 is obtained by expansion in the number of elements and resealing of their values. Therefore, the diagonalization of $R_Q$ (eqn. 16) requires at most $O(Q^3)$ computational power, which is much better than $O(V^3)$. It is practical for relatively large values of Q, on the order of 10,000. Notably, since this calculation has to be done only once per object 105, as opposed to once for every query 103 in said plurality of queries 102, it can be performed off line and the results stored 302. Also, since typically Q<<V, the storage requirements,—for $O(Q^2)$ elements,—are reasonable in practice.

Optimal Viewpoint-Independent Dimensionality Reduction

A method is disclosed to reduce the dimensionality of the spatial covariance matrix 201 (eqn. 2), and at the same time preserve most of its eigen-structure 210. Although vector quantization with Q≈10,000 and the subsequent diagonalization of a system of that size is feasible, it cannot be performed in real time, nor, many times for every query 103—once for every different target object in said database 101. In this section we disclose a method to speed up the calculation of the viewpoint-dependent illumination subspace 107.

The method is based on the fact that the rendering process has two steps. On one hand, features on the 3D surface of the object are mapped to locations on the 2D image plane of the camera. That is, any property $\phi(u,v)\equiv\phi(u)$ that is associated with the surface point $u\equiv(u,v)$ is mapped to a property on the image plane $\phi(x)$, through the viewpoint-dependent warp x(u). This warp 304 is entirely a geometric entity, and depends only on the viewpoint.

On the other hand, the surface properties $\phi$ interact with the light, and possibly the viewpoint, to give rise to image features $\phi$. Therefore, to the extent that the surface properties do not interact with the viewpoint, all calculations can be made in the viewpoint-independent coordinate system (u, v), and, at a later stage, warped to the image plane in a viewpoint-dependent manner. Hence, any basis of the viewpoint-dependent illumination subspace is a warp of a viewpoint-independent basis, defined on the surface of the object. Since the warps preserve neither the lengths of the vectors in the basis, nor the angles between them, a warp of a viewpoint-independent eigenbasis hierarchy (eqn. 2) does not necessarily result in a viewpoint-dependent eigenbasis hierarchy. Nevertheless, for any warp, there is region on the surface that maps more or less linearly to most of the area on the image plane. Hence, if the viewpoint-independent eigenbasis describes well that region on the surface, its warp will describe well the image. This is the foundation for the following method.

For every object in said database 101, generate 201 and diagonalize 210 its vector-quantized viewpoint-independent covariance matrix 208, $R_Q$, and from it, determine the eigenbasis hierarchy defined on the surface of the object $$R(u,v) \approx \sum_{r=1}^{Q} \psi_r(u)\sigma_r^2 \psi_r(v) \quad (17)$$

Further, choose a cutoff, N, such that the average residual power, $tr(R_N)$ (eqn. 4), is sufficiently small. Ratios of residual to noise power in the [0.1–10] range work well in practice. Keep only the first N eigensurfaces and store them for subsequent use 204. Because this computation is viewpoint-independent, it can be done off line, once per object 105 in said database 101, and the results, stored 204. Typically, even though Q≈10,000 is practical as an off line computation, only the first N≈100 eigen-surfaces need to be preserved.

Finally, at the viewpoint-dependent stage—when a query 103 at a particular viewpoint needs to be matched to the objects in said database—warp 304 the eigen-surfaces 204 (eqn. 17) to a basis 301 of the viewpoint-dependent illumination subspace 107

$$\psi_r(x)=\psi_r(x(u)) \qquad (18)$$

These final warps can be implemented as lookups in a table, which is very fast.

Efficient Generation of Many Viewpoint-Dependent Subspaces from the Viewpoint-Independent One An efficient method is disclosed to generate a low-dimensional basis of the viewpoint-dependent illumination subspace 107 (eqn. 18) from the pre-computed viewpoint-independent hierarchy of eigen-surfaces 204 (eqn. 17). Although this can be done for a dimensionality as low as N≈100, which is the recommended practice, reduction of N much further is not possible, because all areas of the surface need to be represented sufficiently well. On the other hand, there is theoretic (see R. Basri et al., supra.) and experimental evidence that the matching can be performed in a space with dimension M, $4 \leq M \leq 9$. See P. Hallinan, supra.; A. Georghiades et al., supra.; R. Ishiyama et al., supra.; and R. Basri et al., supra. M is the final dimensionality of the viewpoint-dependent subspace in which recognition is performed. The value of M can be up to 20. In the preferred embodiment, M is between 4 and 9, but values up to 11 have been used. In addition, the value of N should be such that $2M \leq N \leq 8M$. We disclose an efficient method to find the leading M-dimensional viewpoint-dependent eigen-subspace of the N-dimensional viewpoint-dependent non-eigen-subspace.

$$R(x,y) = \sum_{p=1}^{M} \bar{\psi}_p(x) \bar{\sigma}_p \bar{\psi}_p(y) \qquad (19)$$

where $$\bar{\sigma}_p \bar{\psi}_p(x) = \sum_{r=1}^{N} U_{pr} \tilde{\psi}_r(x)$$

where $\bar{\sigma}_p$ and $U_{pr}$ are determined by the eigenvalue decomposition of an N×N matrix $B_{rs}$ where $$B_{rs} = \sum_x \tilde{\psi}_r(x) \sigma_r \sigma_s \tilde{\psi}_s(x) = U_{pr} \sigma_p^2 U_{ps}$$

Since this viewpoint-dependent step requires a diagonalization of a matrix of dimensionality N≈100, it is very fast and can be performed on line, many times, once for each trial match between the query 103 and the objects in said database 101.

This allows the off-line computation and storage of the results 204 of the most time-consuming steps in the generation of the illumination subspace 107, once for every object 105 in said database 101, and their subsequent use for efficient fast on-line matching 306 of said plurality of queries 102.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method to calculate an element R(x,y) of a viewpoint-independent spatial covariance matrix of a given object in a database for infinitely dense sampling of illumination conditions, the method comprising:

calculating $E(u_x,u_y,c)$, an integral over all possible light directions, weighted by their respective intensities, according to the equation:

$$E(u_x,u_y,c) = \int_{n \in S^2} L(n) D(n,p,q)$$

where $n \in S^2$ is a particular direction on the unit sphere, $S^2$, where L is the light intensity and n is a normal vector on the unit sphere $S^2$, where $u_x$ and $u_y$ are the unit vectors of the special coordinate system defined by p and q, where p and q are vectors in which the x-axis is the bisector of the angle, 2θ, between them, where p=(c,+s,0) and q=(c,−s,0), where c=cos θ, s=sin θ, and (x,y) is the image point;

solving for the viewpoint-independent spatial covariance matrix R(x,y) according to the equation:

$$R(x,y) = \alpha(x)\alpha(y) E(u_x,u_y,c)$$

where α(x) is the intrinsic reflectance at the image point x and α(y) is the intrinsic reflectance at the image point y; and tabulating and storing the result of said viewpoint-independent spatial covariance matrix R(x,y).

2. A method to calculate an element R(x,y) of a viewpoint-independent spatial covariance matrix of a given object where there is no preferred direction in the illumination, the method comprising:

calculating E(c(p(x),q(y))), according to the equation:

$$E(c) = \int_{n \in S^2 \cap \{C(n,c)>0\}} c^2 n_x^2 - (1-c^2) n_y^2$$

where $n \in S^2$ is a particular direction on the unit sphere, $S^2$, where C(n,c) is the joint-visibility condition, where n is the given direction, where p and q are vectors in which the x-axis is the bisector of the angle, 2θ, between them, where p=(c,+s,0) and q=(c,−s,0), where c=cos θ, s=sin θ, and (x,y) is the image point;

solving for the viewpoint-independent spatial covariance matrix R(x,y) according to the equation:

$$R(x,y) = \alpha(x)\alpha(y) E(c(p(x),q(y)))$$

where α(x) is the intrinsic reflectance at the image point x and α(y) is the intrinsic reflectance at the image point y; and tabulating and storing the result of said viewpoint-independent spatial covariance matrix R(x,y).

3. The method of claim 2, comprising:

using the Monte Carlo procedure to evaluate the integral for E(c) in claim 2.

4. A method for finding a set of Q pairs of reference values for the albedo and normals, $\{(\hat{\alpha}_q, \hat{q})\}_{q \in Q}$, such that the perturbations are smallest for a given value of Q, the method comprising:

using vector quantization algorithms to cluster a set of vectors $\{(\alpha(x),p(x))\}_{x \in V}$ together in Q clusters;

finding the centroids $\{(\hat{\alpha}_q, \hat{q})\}_{q \in Q}$ of said clusters such that the average distance from the vectors to the nearest respective cluster-centroid, $q(x) \equiv q_x$, is minimal, where $\hat{\alpha}_q$ is a reference albedo to an albedo ($\alpha(x)$, $\hat{q}$ is a reference normal close to a vector normal to the surface, p(x), and x is a point on the surface of an object; and storing the results.

5. The method of claim 4, comprising:

using a Linde-Buzo-Gray algorithm as said vector quantization algorithm.

6. The method of claim 4, comprising:

using a Deterministic Annealing algorithm as said vector quantization algorithm.

7. A method to generate a low-dimensional basis of the viewpoint-dependent illumination subspace from the pre-computed viewpoint-independent hierarchy of eigen-surfaces, the method comprising:

generating and diagonalizing said object's vector-quantized viewpoint-independent covariance matrix $R_Q$;

determining the eigenbasis hierarchy defined on the surface of the object from the results of $R_Q$, using the equation:

$$R(u, v) \approx \sum_{r=1}^{Q} \psi_r(u) \sigma_r^2 \psi_r(v)$$

where Q is the desired complexity, where $\sigma_r^2$ is the non-increasing eigenspectrum of the spatial and the temporal covariance matrices, where $\psi_r(u)$ and $\psi_r(v)$ are the respective orthonormal eigenvectors of said spatial and temporal covariance matrices, and (u,v) is a point on the surface of the object;

choosing a cutoff, N, such that the average residual signal power, $\text{tr}R_N$, is between the values of 0.1–10;

keeping only the first N eigensurfaces and storing the results for subsequent use;

warping said stored N eigensurfaces to a basis of the viewpoint-dependent illumination subspace at the viewpoint-dependent stage using the equation:

$$\psi_r(x) = \psi_r(x(u))$$

when a query at a particular viewpoint needs to be matched to the objects in said database; and storing the results.

8. The method of claim 7, further comprising the step of finding M, the final dimensionality of the viewpoint-dependent eigen-subspace, the method comprising:

warping a viewpoint dependent, non-eigen-subspace of dimensionality N from a viewpoint independent eigen-subspace of dimensionality N; and finding the leading M-dimensional viewpoint dependent eigen-subspace of the N-dimensional viewpoint dependent non-eigen-subspace resulting from said warp, according to the equation:

$$R(x, y) = \sum_{p=1}^{M} \bar{\psi}_p(x) \bar{\sigma}_p \bar{\psi}_p(y)$$

where $$\bar{\sigma}_p \bar{\psi}_p(x) = \sum_{r=1}^{N} U_{pr} \tilde{\psi}_r(x)$$

where $\bar{\sigma}_p$ and $U_{pr}$ are determined by the eigenvalue decomposition of an N×N matrix $B_{rs}$ where $$B_{rs} = \sum_x \tilde{\psi}_r(x) \sigma_r \sigma_s \tilde{\psi}_s(x) = U_{pr} \sigma_p^2 U_{ps}.$$

9. The method of claim 8, comprising:

the final dimensionality of the viewpoint dependent subspace, M, having a value up to 20.

10. The method of claim 9, comprising:

the final dimensionality of the viewpoint dependent subspace, M, having a value between 4 and 9, inclusive.

11. The method of claim 8, comprising:

having the value of N not less than 2 times the value of M, and not more than 8 times the value of M.

* * * * *